United States Patent [19]

Kass et al.

[11] E Re. 31,107

[45] Reissued Dec. 21, 1982

[54] FEEDBACK SHAFT EXTENDING BETWEEN SWASHPLATE AND DISPLACEMENT CONTROL VALVE

[75] Inventors: John J. Kass, Dubuque; Donald O. Johannsen, Sherrill, both of Iowa

[73] Assignee: Deere & Company, Moline, Ill.

[21] Appl. No.: 226,574

[22] Filed: Jan. 19, 1981

Related U.S. Patent Documents

Reissue of:

[64] Patent No.: 4,229,144
Issued: Oct. 21, 1980
Appl. No.: 967,368
Filed: Dec. 7, 1978

[51] Int. Cl.[3] ..... F04B 49/00; F04B 1/30

[52] U.S. Cl. ..... 417/222; 91/506

[58] Field of Search ..... 417/218, 222; 91/505, 91/506; 92/12.2

[56] References Cited

U.S. PATENT DOCUMENTS

| | | | |
|---|---|---|---|
| 3,299,829 | 1/1967 | Jackson et al. | 92/12.2 |
| 3,332,323 | 7/1967 | Roeske | 92/12.2 |
| 3,406,608 | 10/1968 | Diedrich | 91/506 |
| 3,803,987 | 4/1974 | Knapp | 91/506 |
| 3,810,715 | 5/1974 | Week | 417/213 |
| 3,857,541 | 12/1974 | Clark | 251/30 |
| 3,873,240 | 3/1975 | Leduc | 417/222 |
| 3,911,792 | 10/1975 | Hoyl | 91/505 |
| 4,072,442 | 2/1978 | Horiuchi | 417/218 |
| 4,167,895 | 9/1979 | Rubinstein | 91/506 |
| 4,248,137 | 2/1981 | Caruso | 91/506 |

*Primary Examiner*—William L. Freeh

[57] ABSTRACT

A hydrostatic pump unit is located within a housing which serves also as a hydraulic fluid sump. A displacement control valve for controlling actuators for adjusting the angular position of a swashplate of the pump unit is mounted on the exterior of the housing. Disposed along the axis about which the swashplate is adjustable and joining the swashplate to a shiftable sleeve of the control valve is a feedback shaft which acts to return the valve to a null condition when the swashplate arrives at a commanded new displacement effecting position. The feedback shaft has a passage extending therethrough which acts as a drain connection between the valve and the sump defined by the housing. A check valve is located in the passage for preventing fluid from draining from the housing when the valve is disconnected from the feedback shaft for service.

3 Claims, 3 Drawing Figures

FEEDBACK SHAFT EXTENDING BETWEEN SWASHPLATE AND DISPLACEMENT CONTROL VALVE

Matter enclosed in heavy brackets [ ] appears in the original patent but forms no part of this reissue specification; matter printed in italics indicates the additions made by reissue.

BACKGROUND OF THE INVENTION

The present invention relates to variable displacement hydrostatic pump or motor units and controls therefor and more particularly relates to feedback linkages forming a portion of the displacement control means for such units.

In common usage today are hydrostatic pump or motor units including swashplates mounted for selective angular adjustment to increase or decrease the displacements of the units between zero and maximum displacement conditions. The swashplates of these units are controlled by one or more hydraulic actuators connected to the swashplates and selectively actuatable by means of control valves, which each include concentrically mounted first and second axially shiftable valve elements that are normally positioned relative to each other such as to establish a null condition in the valve for maintaining a preselected displacement condition in the pump or motor unit. The first valve element is shiftable axially relative to the second valve element in response to a command input signal such as to cause the actuator or actuators to reposition the swashplate to a new position for effecting a predetermined change in displacement corresponding to the magnitude of the command input signal. A feedback linkage is connected between the swashplate and the second valve element and acts to shift the latter to re-establish the null condition in the valve once the commanded displacement change has been effected. Two examples of such pump or motor units and controls therefor are respectively disclosed in U.S. Pat. No. 3,803,987 issued to Knapp on Apr. 16, 1974 and U.S. Pat. No. 3,810,715 issued to Week et al on May 14, 1974.

Hydrostatic pump and motor units of the general type just described are commonly coupled together to form transmissions for driving various machine parts and for driving ground wheels or tracks of vehicles. These transmissions often include a transmission case or housing which contains a pump and motor unit set and the associated control valves for the pump and motor units are mounted on the exterior of the case and coupled to the swashplate of the associated unit by a feedback linkage projecting through the case. As the case sometimes serves also as a reservoir for the hydraulic fluid used to operate the pump and motor units and the displacement control actuators, it is necessary to ensure that the interface between each control valve and the case is adequately sealed to prevent leakage of the hydraulic fluid from the case. U.S. Pat. No. 3,857,541 shows the example of how the control valve side of that part of the valve-to-case interface would have to be ported and sealed for permitting control fluid to be routed to and from the control valve.

The hydrostatic pump or motor units and controls therefor of the type described hereinabove suffer from one or more of the disadvantages of:

1. Having too much looseness in the feedback linkage resulting in inaccurate pump or motor displacement control.

[2. Having a feedback linkage which occupies a relatively large amount of space and/or requires such space for its operation.]

*2. Having the control valve connected to the transmission housing such that a large amount of fluid drains from the housing when the control valve is disconnected for repairs.*

[3. Having the feedback linkage connected to the control valve such that when the control valve is mounted on the exterior of a transmission case the installation and/or removal of the control valve is made somewhat difficult.]

[4. Having the control valve connected to the transmission case such that a large amount of fluid drains from the case when the control valve is disconnected for repairs.]

SUMMARY OF THE INVENTION

According to the present invention there is provided an improved feedback linkage connected between a displacement control valve for a hydrostatic pump or motor unit and an angularly adjustable swashplate of the unit and more specifically there is provided such a feedback linkage which is particularly adapted for use with hydrostatic transmissions wherein the control valve is mounted on the exterior of a case or housing of the transmission, which serves also to hold a supply of hydraulic fluid and wherein the pump or motor unit is located within the case or housing.

It is an object of the invention to provide a feedback linkage of simple construction which works to accurately null the control valve in response to the swashplate arriving at a new commanded position. This object is primarily accomplished by constructing the feedback linkage in the form of a shaft which is disposed along the pivot axis of the swashplate and connected at one of its end to the swashplate by an interference connection ensuring concurrent and equal angular movement of the swashplate and feedback shaft.

It is a further object to provide a feedback linkage which occupies and/or operates in a minimum of space. This object is accomplished by constructing a feedback linkage in the manner set forth above in discussing the previous object and also by providing a ball-and-socket connection between an end of the feedback shaft and a shiftable element of the control valve, the connection being located eccentrically to the pivot axis of the swashplate and feedback shaft.

Yet another object is to provide a connection between the control valve and feedback shaft, of the immediately preceding object, which lends to easy installation and removal of the control valve. This object is accomplished by the provision of the previously mentioned ball-and-socket connection and additionally by providing the feedback shaft with a specially configured end portion for piloting the feedback shaft into a mating receptacle provided in the control valve such as to guide together the respective connection portions of the valve element and feedback shaft making up the ball-and-socket connection.

Still another object is to provide a control valve which may be disconnected from the exterior of a transmission case containing a pump or motor unit controlled by the valve without there being a large loss of fluid from the case when the latter is also serving as a hydraulic fluid reservoir. This object is accomplished by providing the feedback shaft, described in one or more of the objects above, with a drilled passage which serves as the sole passage for conveying exhaust fluid from the control valve to the interior of the transmission case and by providing a one-way valve, in the form of a check ball, within the passage for permitting fluid flow only in the direction of the transmission case.

These and other objects will become apparent from a reading of the ensuing description together with the appended drawings.

DESCRIPTION OF THE PREFERRED EMBODIMENT

Figure 1:
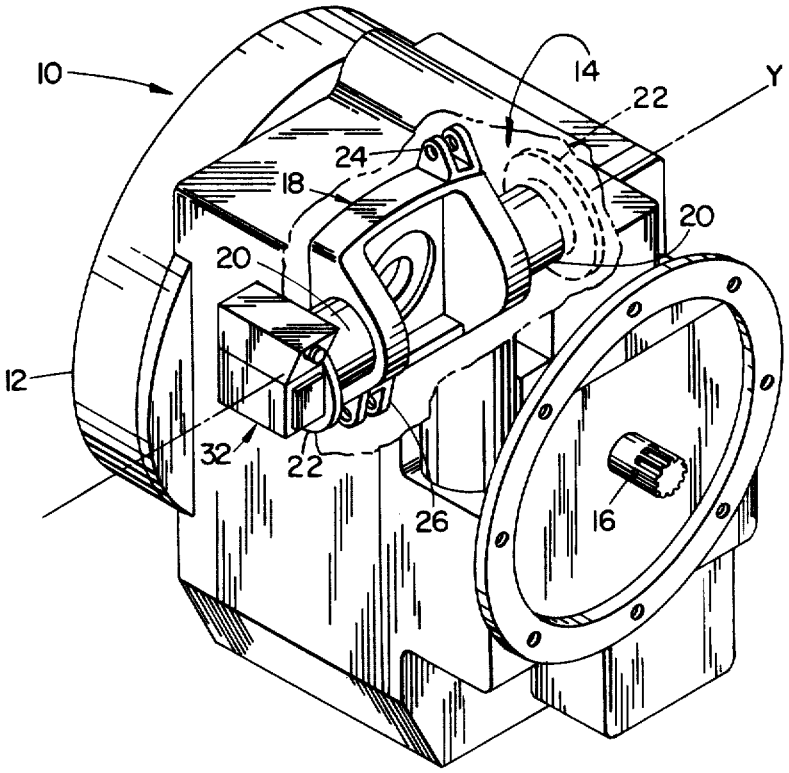
FIG. 1 is a somewhat schematic perspective view of a hydrostatic transmission of a type with which the present invention is particularly adapted for use, with certain parts of the transmission being broken away to better expose the manner of mounting the pump swashplate.

Referring now to FIG. 1, therein is shown a hydrostatic transmission 10 which typifies those with which the present invention is particularly adapted for use. The transmission 10 includes a sealed case or housing 12 which contains a reversible, variable displacement pump 14, only partly shown. Also contained within the case 12 but not illustrated here is a fixed or a variable displacement motor and hydraulic circuitry connecting the pump 14 to the motor such as to form a closed loop system, as is well known in the art. An input drive shaft 16 extends into and is supported by the case 12 and is coupled to the pump, for transmitting drive torque to the latter, by means of conventional gears and shafting (not shown).

The pump 14 includes a swashplate 18 having axially aligned stub shafts 20 at its opposite sides and respectively rotatably supported by a pair of trunnions 22 forming opposite side portions of the transmission case 12. The swashplate 18 is thus trunnion-mounted for angular adjustment, about an axis Y passing centrally through the shafts 20, for the purpose of effecting changes in the displacement of the pump and hence in the speed of rotation of the unshown motor hydraulically coupled to the pump. Specifically, the swashplate 18 is illustrated in a centered position wherein it effects a zero-displacement condition in the pump. As the angular displacement of the swashplate 18 from its centered position increases in opposite first and second angular directions, the fluid displaced by the pump increases in opposite first and second directions therethrough.

Figure 3:
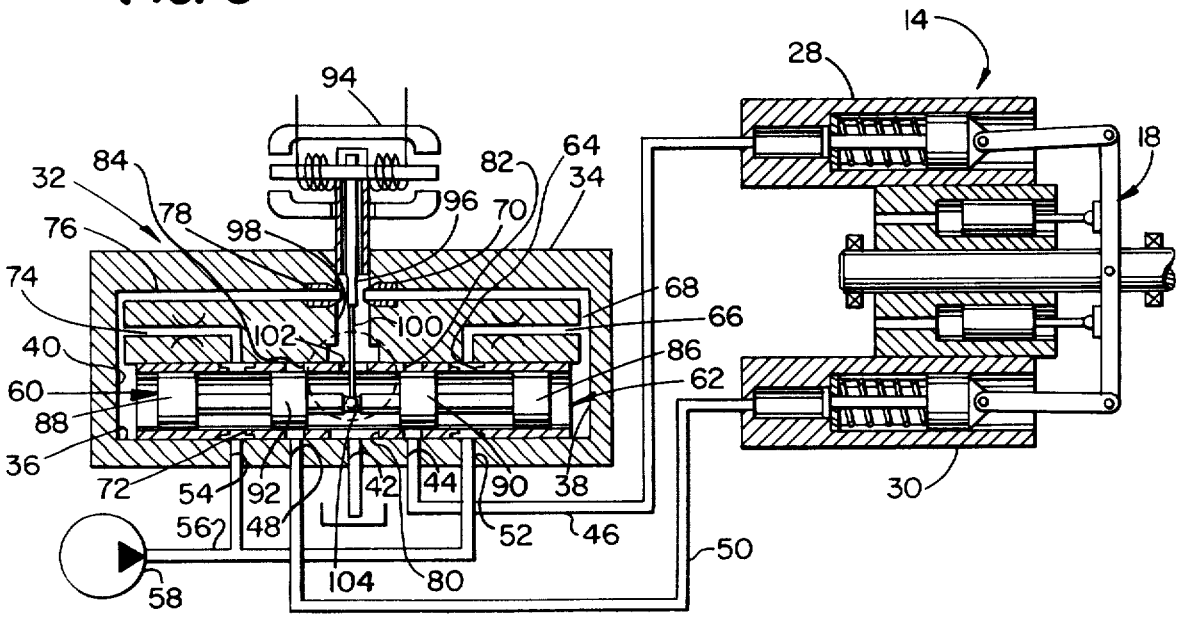
FIG. 3 is a schematic representation of a hydrostatic pump and control valve therefor.

As can best be seen in FIG. 1, the swashplate 18 includes upper and lower connection brackets 24 and 26 respectively located above and below the axis Y. Referring now to FIG. 3, it can be seen that upper and lower, single-acting hydraulic actuators 28 and 30 are respectively connected to the brackets 24 and 26 and are operative when selectively actuated to effect angular adjustment of the swashplate 18.

Figure 2:
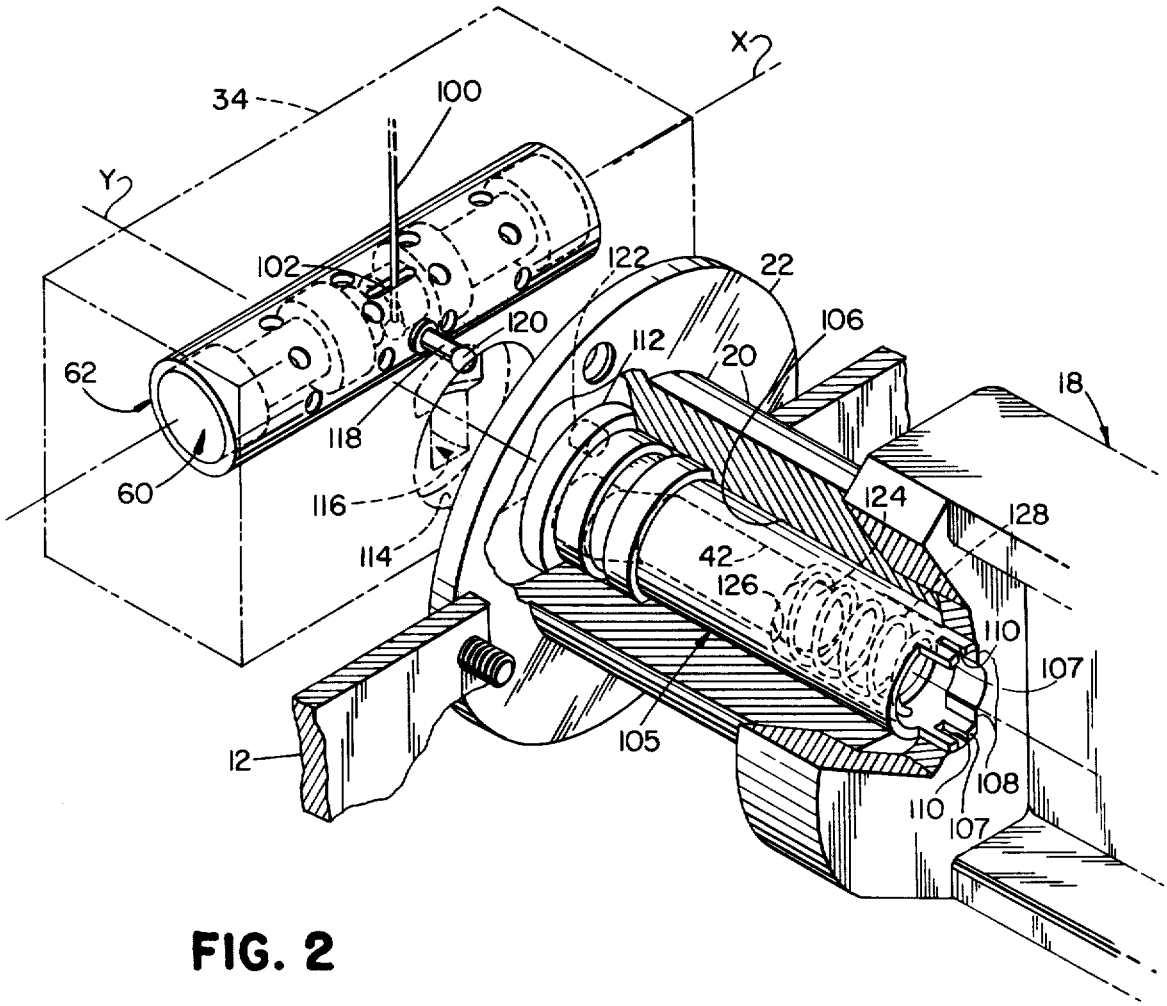
FIG. 2 is a somewhat schematic perspective view of a portion of the swashplate shown in FIG. 1 but with sections broken away to expose a feedback shaft connected to the swashplate and in addition showing a portion of the control valve positioned for movement toward the feedback shaft for connection with the latter.

The actuators 28 and 30 are, in turn, selectively controlled by means of an electro-hydraulic direction control valve 32, which is mounted on the exterior of the transmission case 12 at one of the trunnions 22. The valve 32 may take many forms but is here (FIG. 3) disclosed schematically as being, for the most part, similar to the valve disclosed in the aforementioned U.S. Pat. No. 3,857,541 granted to Clark on Dec. 31, 1974, the difference being that the valving in the instant case is particularly constructed to accommodate the present invention. Specifically, the valve 32 includes a valve body 34 defining a valve bore 36, disposed along an axis X (FIG. 2) extending above and orthogonally to the axis Y. The bore 36 has right and left closed ends 38 and 40, respectively, as viewed in FIG. 3. Communicating with the bore 36 at a central location between the closed ends thereof is a drain passage 42. A first control port 44 communicates with the bore 36 at a location spaced axially rightwardly from the passage 42 and is joined to the actuator 28 by a control line 46 while a second control port 48 similarly communicates with the bore at a location spaced axially leftwardly from the passage 42 and is joined to the actuator 30 by a control line 50. Communicating with the bore 36 at a location between the first control port 44 and right end 38 is a first pressure supply port 52 while a second pressure supply port 54 communicates with the bore at a location between the second control port 48 and the left end 40. A branched supply line 56 joins the output of a pump 58 with the ports 52 and 54. The pump 58 is preferably located within the transmission case 12 and the latter preferably serves as a fluid reservoir and has a sump portion to which an inlet of the pump 58 is connected.

The flow of fluid between the supply, control and exhaust ports is controlled by a first valve element in the form of a valve spool 60 and a second valve element in the form of a valve sleeve 62, the spool 60 being axially shiftably mounted within the sleeve 62 and the sleeve 62 being axially shiftably mounted in the bore 36. The sleeve 62 is provided with a first set of ports 64 which establish constant fluid communication between the supply port 52 and one end of a first restricted passage 66 which supplies fluid to a first pilot pressure passage 68 having a nozzle 70 at one end and having its other end in constant fluid communication with the bore end 38. Similarly, the sleeve 62 is provided with a second set of ports 72 which establish constant fluid communication between the supply port 54 and one end of a second restricted passage 74 having its other end connected to a second pilot pressure passage 76 having a nozzle 78 at one of its ends and having its other end in fluid communication with the bore end 40. Located centrally between the ends of the sleeve 62 is a drain port 80 which is in continuous fluid communication with the drain port 42. A first set of control fluid ports 82 are located in the sleeve 62 between the port 80 and the first set of ports 64 such as to establish constant fluid communication with the control port 44 while a second set of control-fluid ports 84 are similarly located between the port 80 and the second set of ports 72 such as to establish constant fluid communication with the control port 48. Thus, although the sleeve 62 shifts within the bore 36, it in no way obstructs flow from occurring through the drain port 42, control ports 44 and 48 or supply ports 52 and 54.

Actual control of flow through the valve body ports just mentioned is accomplished by the spool 60 and for this purpose the latter includes first and second end lands 86 and 88 respectively exposed to pilot fluid pressure at the bore ends 38 and 40, and a set of first and second lands 90 and 92 located such as to block the control fluid ports 82 and 84 of the sleeve when the spool 60 bears a centered null position relative to the sleeve 62, as illustrated in FIG. 3.

Pilot pressure at the ends of the spool 60 is controlled by means of an electric torque motor 94 for controlling the position of a nozzle flapper 96 relative to the pilot pressure passage nozzles 70 and 78, the latter being located on opposite sides of the flapper 96, which is in turn located in a passage 98 which extends in the valve body 34 orthogonally to the valve bore 36 from the exterior of the valve body to a central location between the ends of the bore. Joined as a continuation of the flapper is a feedback spring 100 which extends through an opening 102 provided in the sleeve 62 and terminates in a ball enlargement received in a groove 104 provided centrally in the spool 60 between the opposite ends of the latter.

The mode of operation of the torque motor 94 as regards its control over the movement of the valve spool 60 is well known to those skilled in the art. Suffice it to say that an electrical command input signal received by the torque motor 94 will cause the latter to operate in accordance with the direction and magnitude of the signal received to move the flapper 96 toward one or the other of the nozzles 70 and 78 to thus further restrict flow from the same and effect a pressure imbalance in the pilot pressure passages 68 and 76 and hence a pressure imbalance across the spool 60. The spool 60 will be shifted by this pressure imbalance and as it shifts the feedback wire 100 will be deflected until it substantially counterbalances the action of the electrically induced action of the torque motor. Hence spool displacement and direction corresponds to the direction and magnitude of the electrical signal received by the torque motor.

Once the valve spool 60 has been shifted relative to the sleeve 62, fluid will flow to one and from the other of the actuators 28 and 30. For the purpose of causing the flow of fluid to and from the actuators 28 and 30 to be blocked once the swashplate 18 reaches a new desired position as commanded by the input signal received by the torque motor 94, a feedback shaft 105 (FIG. 2) is coupled between the swashplate 18 and the sleeve 62 such as to shift the latter to follow the movement of the spool 60 to restore the null condition. Specifically, the shaft 105 is located along the pivot axis of the swashplate 18 and is received in a hole 106 provided centrally in the trunnion 22. The inner end of the feedback shaft 105 includes diametrically opposite axial extensions 107 which define a forked connection part that is received in complimentary diametrically opposite axially extending grooves 108 provided in the inner end portion of the sub shaft 20. The extensions 107 are each provided with an axially extending notch 110 which permits the extensions to be resiliently deflected to effect a tight interference connection when the extensions 107 are forced into the grooves 108 during assembly. The outer end of the shaft 105 is provided with an annular increased diameter surface 112 sized for reception in an annular entrance 114 of a passage 116 provided in the housing 34 and extending to the bore 36. Fixed to the sleeve 62 and projecting into the passage 116 is a rod 118 having a ball end 120 disposed for being received in a socket 122 extending into the outer end of the shaft 105 at a location eccentric to the axis Y. Thus, it will be appreciated that movement of the control valve 34 along the axis Y toward the shaft 105 in FIG. 2 will first result in the shaft pilot surface 112 entering the annular entrance 114 of the passage 116, the entrance 114 then guiding or piloting the housing 34 onto the shaft 105 such that the ball end 120 of the rod 118 is guided into the socket 122. It will be appreciated then that angular movement of the swashplate 18 will be transmitted to the sleeve 62 via the shaft 105 such as to effect axial shifting movement of the sleeve.

It is here noted that the drain passage 42 shown in FIG. 3 is actually provided in the form of a bore which extends lengthwise through the shaft 105. Fluid is prevented from escaping from the case 12 by way of the passage 42 by means of a check ball 124 located in the passage 42 and biased toward an inwardly facing valve seat 126, provided in the passage by means of a coil spring 128.

The operation of the invention is briefly as follows. First, if it is assumed that the swashplate 18 initially occupies a centered, zero-displacement effecting position, as illustrated, and that displacement of the swashplate 18 in the clockwise direction, as viewed in FIG. 3, will effect displacement of fluid through the pump 14 in a forward-driving direction, then a forward driving condition may be effected in the transmission by activating the upper actuator 28. In order to accomplish such actuation, the operator need only to connect a predetermined command input signal to the torque motor 94 for causing the latter to move the flapper 96 toward the nozzle 70 such as to further restrict the flow therefrom and cause the pilot pressure in the passage 68 to increase. This increase in pressure will cause the spool 60 to shift leftwardly (FIG. 3) to connect the outlet of the pump 58 to the actuator 28 while connecting the actuator 30 to the drain passage 42 in the feedback shaft 105. This fluid unseats the check ball 124 and flows into the transmission case 12.

As the actuator 28 extends, the swashplate 18, and consequently the feedback shaft 105, are rotated clockwise. Through its eccentric connection with the valve sleeve 62, the feedback shaft 105 drives the latter leftwardly to re-establish its centered relationship to the spool 60 at which time the lands of the spool will prevent the flow of fluid to and from the actuators 28 and 30 thus resulting in the swashplate 18 being maintained in its new position.

If it should ever become necessary to detach the control valve 32 from the transmission case 12 for service or replacement, for example, the operator need only to unbolt the valve 32 and pull it away from the case to separate the ball-and-socket connection between the sleeve 62 and feedback shaft 105. Despite the fact the case 12 is full of transmission fluid, no great loss of fluid will occur when the valve 32 is removed because the check ball 124 will be seated to prevent leakage from the case 12 through the drain passage 42 and only a relatively small amount of trapped fluid is present in the supply and control passages.

Thus, it will be appreciated that the feedback shaft 105 provides a simple, effective way of transmitting swashplate movement to the valve element 62 and for transmitting exhaust fluid from the valve 32 to the case 12.

We claim:

[1. In an axial piston pump or motor and controls therefor including a pump or motor housing containing a swashplate mounted for angular adjustment, about a fixed axis, between a neutral position for effecting a zero fluid displacement, and various positions at varying angular distances from the neutral position for effecting increasing fluid displacement as the angular distance from its neutral position increases, at least one hydraulic actuator coupled to the swashplate for selectively adjusting the latter in response to receiving control fluid pressure, a source of fluid pressure, a fluid sump, a pilot-operated displacement control valve located exteriorly of the housing and having separate fluid ports respectively coupled to the source of fluid pressure, the sump and the hydraulic actuator and including an axially shiftable spool member located within an axially shiftable sleeve member with the spool and sleeve members normally occupying a centered position relative to each other wherein they cooperate to block the flow of fluid to and from the actuator, a valve controller connected to the spool member for shifting the latter axially relative to the sleeve member a distance corresponding to an input command signal received by the valve controller and a feedback linkage connected between the swashplate and the sleeve member for shifting the latter axially to restore the centered relationship between it and the valve spool member in response to the swashplate moving to a new position corresponding to the input command signal, the improvement residing in the feedback linkage and comprising: a feedback shaft located along said fixed axis and having a first end fixed to the swashplate so that the shaft rocks about the axis with the swashplate during adjustment of the latter, said feedback shaft extending through the housing and having a second end projecting into the control valve in crosswise relationship to the sleeve member and being connected directly to the latter at a location spaced radially from the axis whereby the sleeve member will be reciprocated when the shaft rocks.]

[2. The axial piston pump or motor and controls therefor defined in claim 1 wherein the housing serves as the sump and wherein a drain passage extends lengthwise through the feedback shaft and serves as the sole connection between the sump and the control valve.]

[3. The axial piston pump or motor and controls therefor defined in claim 2 wherein a check valve is located in said drain passage for preventing fluid from flowing from the case toward the control valve, whereby the control valve may be disconnected from the feedback shaft and removed for servicing without a substantial amount of fluid being lost from the case.]

[4. The axial pump or motor and controls therefor defined in claim 1 wherein the feedback shaft is connected to the swashplate by means of a spherical ball stud fixed to one of the sleeve members and feedback shaft and received in a hole provided in which ever one of the sleeve members and feedback shaft that does not have the stud fixed thereto.]

[5. The axial piston pump or motor and controls therefor defined in claim 4 wherein the control valve includes a valve housing; said valve housing being provided with a cylindrical pilot surface disposed coaxially with said fixed axis; and said feedback shaft having a cylindrical pilot portion shaped complementary to the pilot surface and received therein whereby, during assembly, the pilot surface and pilot portion cooperate to properly guide the control valve onto the feedback shaft for effecting connection of the sleeve member with the feedback shaft.]

[6. The axial piston pump or motor and controls therefor defined in claim 1 wherein the connection of the feedback shaft to the swashplate is an interference connection and includes at least one pair of diametrically opposite, resiliently deflectable, axial projections at an end of the feedback shaft and a receptacle shaped complementary to the end of the feedback shaft and including a pair of grooves respectively receiving the pair of projections in a resiliently deflected condition whereby a tight interference fit is established.]

[7. The axial piston pump or motor and controls therefor defined in claim 6 wherein each of the pair of axial projections is provided with an axial notch to enhance its resiliency.]

[8. In a control for selectively adjusting a swashplate of an axial piston pump or motor angularly about a first axis, and including a hydraulic actuator means coupled to the swashplate; a normally balanced control valve connected to the actuator means and to a sump and source of fluid pressure and normally connecting the actuator means to the sump; a control input means connected to the control valve for selectively effecting an unbalanced condition therein wherein fluid pressure is routed to the actuator means to cause the latter to effect a preselected change in the angular position of the swashplate, and a feedback linkage connected between the swashplate and the control valve for restoring the latter to its balanced condition upon the swashplate undergoing said prescribed, change in angular position about said axis; the improvement residing in said feedback linkage and including a feedback shaft located along said axis and including a first end joined directly to the swashplate for angular movement therewith; and said control valve including an axially shiftable valve element extending cross-wise to the feedback shaft and joined directly to the latter at a location displaced radially from said axis whereby angular movement of the swashplate effects axial shifting of the valve element to restore the control valve to its balanced condition.]

[9. The axial piston pump or motor and controls therefor defined in claim 8 wherein the connection of the feedback shaft to the swashplate is an interference connection and includes at least one pair of diametrically opposite, resiliently deflectable, axial projections at an end of the feedback shaft and a receptacle shaped complementary to the end of the feedback shaft and including a pair of grooves respectively receiving the pair of projections in a resiliently deflected condition whereby a tight interference fit is established.]

[10. The axial piston pump or motor and controls therefor defined in claim 9 wherein each of the pair of axial projections is provided with an axial notch to enhance its resiliency.]

*11. In a control for selectively adjusting a swashplate, of an axial piston pump or motor, angularly about a first axis and including a hydraulic actuator means coupled to the swashplate; a normally balanced control valve connected to the actuator means, to a sump and to a source of fluid pressure and normally blocking the actuator means from the sump and source of fluid pressure, a control input means connected to the control valve for selectively effecting an unbalanced condition wherein fluid pressure is routed to the actuator means to cause the latter to effect a preselected change in the angular position of the swashplate, and a feedback shaft connected between the swashplate and the control valve for restoring the latter to its balanced condition upon the swashplate undergoing said preselected change in angular position about said axis, the improvement residing in said feedback shaft and including an interference connection between an end of the feedback*

*shaft and the swashplate defined by at least one pair of diametrically opposite, resiliently deflectable axial projections at the end of the feedback shaft, and a receptacle defining a pair of diametrically opposite, axially extending grooves respectively receiving the pair of projections in a resiliently deflected together condition whereby a tight interference fit is established.*

*12. The axial piston pump or motor and controls therefor defined in claim 11 wherein each of the pair of axial projections is provided with an axial notch to enhance its resiliency.*

*13. In a control for selectively adjusting a swashplate, of an axial piston pump or motor, angularly about a first axis and including a hydraulic actuator means coupled to the swashplate and located together within a transmission housing; a normally balanced control valve located exteriorly of the housing and connected to the actuator means, to a sump defined by the housing and to a source of fluid pressure and normally blocking the actuator means from the sump and source of fluid pressure, a control input means connected to the control valve for selectively effecting an unbalanced condition wherein fluid pressure is routed to the actuator means to cause the latter to effect a preselected change in the angular position of the swashplate, and a feedback shaft connected between the swashplate and the control valve for restoring the latter to its balanced condition upon the swashplate undergoing said preselected change in angular position about said axis, the improvement residing in said feedback shaft and including a fluid passage extending lengthwise through the feedback shaft and serving as the sole fluid connection between the control valve and the sump and a check valve located in said drain passage for preventing fluid from flowing from the housing toward the control valve whereby the control valve may be disconnected from the feedback shaft and removed for servicing without a substantial amount of fluid being lost from the housing.*

* * * * *